(12) United States Patent
Melkomian

(10) Patent No.: US 12,453,334 B1
(45) Date of Patent: Oct. 28, 2025

(54) DISPOSABLE WEATHER-PROTECTIVE ANIMAL GARMENT

(71) Applicant: Raymond Melkomian, West Palm Beach, FL (US)

(72) Inventor: Raymond Melkomian, West Palm Beach, FL (US)

( * ) Notice: Subject to any disclaimer, the term of this patent is extended or adjusted under 35 U.S.C. 154(b) by 0 days.

(21) Appl. No.: 18/799,136

(22) Filed: Aug. 9, 2024

Related U.S. Application Data

(60) Provisional application No. 63/518,782, filed on Aug. 10, 2023.

(51) Int. Cl.
*A01K 13/00* (2006.01)

(52) U.S. Cl.
CPC ................... *A01K 13/006* (2013.01)

(58) Field of Classification Search
CPC .. A01K 13/006; A01K 13/007; A01K 13/008; A01K 27/002
See application file for complete search history.

(56) References Cited

U.S. PATENT DOCUMENTS

| | | | |
|---|---|---|---|
| 7,044,087 B1 | 5/2006 | Brecheen | |
| 7,121,231 B2 | 10/2006 | Benefiel | |
| 7,195,618 B2 | 3/2007 | Ikegami | |
| RE39,564 E | 4/2007 | Brezinski | |
| 7,637,087 B1 * | 12/2009 | Graham | A01K 13/008 |
| | | | 54/79.2 |
| 7,793,619 B2 | 9/2010 | Kajanoff | |
| 8,210,131 B2 | 7/2012 | Friedland | |
| 8,707,910 B1 * | 4/2014 | Koll | A01K 13/006 |
| | | | 119/850 |
| 8,733,296 B1 * | 5/2014 | Douglas | A01K 13/006 |
| | | | 119/856 |
| 8,851,020 B2 * | 10/2014 | Pesale | A01K 23/00 |
| | | | 119/869 |
| 8,863,699 B2 * | 10/2014 | Bishop | A01K 13/006 |
| | | | 119/850 |
| 9,398,755 B2 | 7/2016 | Schnieder | |
| 10,085,420 B2 | 10/2018 | Potts | |
| 10,874,087 B2 * | 12/2020 | Prazza | A01K 13/007 |
| 2007/0056530 A1 | 3/2007 | Nassour | |
| 2008/0110414 A1 | 5/2008 | Buehner | |
| 2008/0264351 A1 | 10/2008 | Williams | |
| 2009/0173290 A1 | 7/2009 | Freitag | |
| 2009/0205586 A1 | 8/2009 | Matthews | |
| 2010/0115895 A1 * | 5/2010 | Prill | A01K 13/006 |
| | | | 54/79.2 |
| 2010/0132631 A1 | 6/2010 | Walker-Algaze | |
| 2010/0206247 A1 * | 8/2010 | Cheng | A01K 13/006 |
| | | | 119/850 |
| 2013/0276719 A1 | 10/2013 | Ferrando | |
| 2014/0053790 A1 * | 2/2014 | Rumps | A01K 13/006 |
| | | | 119/850 |

(Continued)

*Primary Examiner* — Trinh T Nguyen
(74) *Attorney, Agent, or Firm* — Knowmad Law; Christopher McElwain

(57) ABSTRACT

A disposable weather-protective garment for non-human animals is disclosed. The garment incorporates streamlined design features which reduce manufacturing costs and facilitate packaging a plurality of garments as a unit and is preferably composed of biodegradable and/or compostable materials. The garment features leg slits through which the animal's feet and legs pass and may feature a hood secured by an adjustable strap.

10 Claims, 8 Drawing Sheets

(56) References Cited

U.S. PATENT DOCUMENTS

| | | |
|---|---|---|
| 2014/0318478 A1 | 10/2014 | Cruz |
| 2016/0057975 A1 | 3/2016 | Miller |
| 2017/0006827 A1* | 1/2017 | Miller .................. A01K 23/005 |
| 2017/0086424 A1 | 3/2017 | Blanchet |
| 2019/0021281 A1 | 1/2019 | Fultz |
| 2020/0367472 A1* | 11/2020 | Zarras .................. A01K 13/006 |
| 2023/0345910 A1* | 11/2023 | Martensson ......... A01K 13/006 |

* cited by examiner

Sizing Chart for Customer:

| Size Code | Description | Length from Base of Tail to Base of Neck (in) | Chest Girth (in) | Neck (in) | Weight (lbs) |
|---|---|---|---|---|---|
| XXS | Petite | 7-11 | 9-13 | 6-8 | 2-5 |
| XS | Extra Small | 9-13 | 12-16 | 7-10 | 6-11 |
| S | Small | 12-16 | 15-21 | 8-12 | 9-16 |
| M | Medium | 15-19 | 20-26 | 10-15 | 15-31 |
| L | Large | 17-21 | 23-29 | 12-18 | 25-43 |
| XL | Extra Large | 20-29 | 25-32 | 17-22 | 40-65 |
| XXL | 2 Extra Large | 25-30 | 31-38 | 20-23 | 60-115 |
| XXXL | 3 Extra Large | 31-34 | 38-43 | 24-28 | 116+ |

| Size Code / Line Code | Breed(s) |
|---|---|
| XXS | Teacups |
| XS | Toy Poodle, Yorkie, Toy Fox Terrier, Papillon, Chihuahua, Maltese |
| S | Shih Tzu, Bichon, Boston Terrier, Norfolk Terrier, Wire Hair or Larger Dachshund, Jack Russell |
| M | Corgi, Lhasa Apso, Beagle, Cocker Spaniel, Westie |
| L | Labrador, Dalmation, Pitbull |
| XL | Golden Retriever, Greyhound, German Shepherd |
| XXL | Boxer, BullMastiff, Rottweiler |
| XXXL | Mastiff, Great Dane |

FIG. 8 sing the garment to the animal. These features can be cumbersome to use and increase the time required to put on the garment, making an impatient pet more irritable and reluctant to cooperate. Similarly, existing garments often incorporate sleeves, which at least partially sheath one or more of the animal wearer's legs. Sleeves restrict the animal's movement, increase the overall weight of the garment, and may further increase the difficulty of putting the garment on and taking it off an animal.

DISPOSABLE WEATHER-PROTECTIVE ANIMAL GARMENT

PRIORITY CLAIM

This non-provisional application claims priority to Provisional Patent Application Ser. No. 63/518,782, entitled "DISPOSABLE WEATHER-PROTECTIVE ANIMAL GARMENT," filed on Aug. 10, 2023, which is included by reference as fully set forth herein.

TECHNICAL FIELD

The present invention relates generally to the field of garments for non-human animals, and more specifically without limitation, to a disposable animal garment providing protection from rain and other weather.

BACKGROUND OF THE INVENTION

Like their human owners, pets are vulnerable to rain, snow, and other harsh weather. Many domestic animals necessarily spend significant time outdoors and are often exposed to environmental conditions for which they may be ill-adapted.

Pet ownership in the United States has risen steadily in recent decades. Two out of every three American households now include a pet. 393.3 million pets live in the United States. 53% of American households include at least one dog.

There is a great need among these pet owners for weather protection solutions for animals. Dogs, in particular, must be taken outside regularly to urinate and defecate and for play and exercise; many are reluctant to do so in rainy or snowy conditions. Meanwhile, pet groomers often desire to prevent their clients' animals' newly bathed coats from becoming immediately soiled by the elements. Likewise, veterinarians have a need for a means of keeping animals' wounds, sutures, and bandages dry after their patients leave following a procedure.

Most existing solutions take the form of non-disposable pet raincoats. Such garments have numerous shortcomings. Among other things, they tend to be costly, cumbersome to wear, and prone to tears and other damage. Because, by definition, they are intended to be exposed to rain and other harsh environmental conditions, such garments quickly become soiled and worn. For example, dog raincoats may quickly develop the notorious "wet dog" odor, which owners find difficult to eliminate.

When inevitably damaged and/or soiled and discarded, these non-disposable garments are difficult to recycle and generally end up in landfills, where they may remain for centuries without degrading.

Most existing pet raincoats utilize extrinsic fastening elements, such as adhesives, Velcro®-type hook-and-eye fasteners, buttons, laces, or buckles, to secure the garment to the animal. These features can be cumbersome to use and increase the time required to put on the garment, making an impatient pet more irritable and reluctant to cooperate. Similarly, existing garments often incorporate sleeves, which at least partially sheath one or more of the animal wearer's legs. Sleeves restrict the animal's movement, increase the overall weight of the garment, and may further increase the difficulty of putting the garment on and taking it off an animal.

Some existing pet raincoats may include a hood. Typically, such hoods comprise a large opening through which the animal's head passes. Such hoods are prone to slipping back down the animal's neck, and, if not sized precisely, may obscure the animal's eyes or face.

Another problem with non-disposable raincoats is sizing. The size range of animals which may need weather-protective garments is wide. For example, the size disparity among domestic dog breeds must be taken into account in designing and manufacturing pet garments. It is often not possible to simply scale up the dimensions of a garment designed for a six-pound chihuahua in order to fit the body of a 116+-pound great dane. Moreover, it is often impractical to offer non-disposable pet garments in the wide range of sizes necessary to fit the varied shapes and sizes of all dog breeds, due to the cost and/or complexity of manufacturing such garments. Such problems of scale are exacerbated with respect to animals of different species, such as dogs and horses.

There is thus a longstanding need for a weather-protective animal garment suitable for disposal after a single use.

SUMMARY OF THE INVENTION

The present invention is a weather-protective garment designed to be worn by non-human animals.

An object of the invention is to provide a garment offering protection from harsh weather and suitable for disposal after single use. Accordingly, the garment incorporates streamlined design features relative to non-disposable garments, which reduce manufacturing costs and facilitate packaging a plurality of garments as a unit. For purposes of environmental sustainability, the garment is preferably composed of biodegradable and/or compostable materials.

A further object of the invention is to provide a garment that can be quickly and easily secured to the animal wearer. Various structural features make the garment easier to put on an animal. In particular, the garment features leg slits through which the animal's feet and legs pass. The garment further features a hood secured by a strap configured to pass underneath the animal's chin. Preferably, said strap is adjustable and includes an adhesive fastener.

In various embodiments, the invention features an opening allowing for attachment of a leash.

Various dimensions of the garment may be defined, such as length, neck girth, front leg width, midsection width, and hind leg width. Using these dimensions, the garment may be provided in various sizes tailored to different animals, such as different breeds of dog.

For a better understanding of the present invention, its functional advantages and the specific objects attained by its uses, reference should be made to the accompanying drawings, claims and descriptive matter in which there are illustrated embodiments of the invention.

BRIEF DESCRIPTION OF THE DRAWINGS

FIG. 8 is a sizing chart illustrating correspondence between garment dimensions and animal size according to various embodiments.

DETAILED DESCRIPTION OF THE INVENTION

The following detailed description is of the best currently contemplated modes of carrying out various embodiments of the invention in which said embodiments can be carried out independently and/or in combination. The description is not to be taken in a limiting sense but is made for at least the purpose of illustrating the general principles of the invention, since the scope of the invention is best defined by the appended claims.

Figure 1:
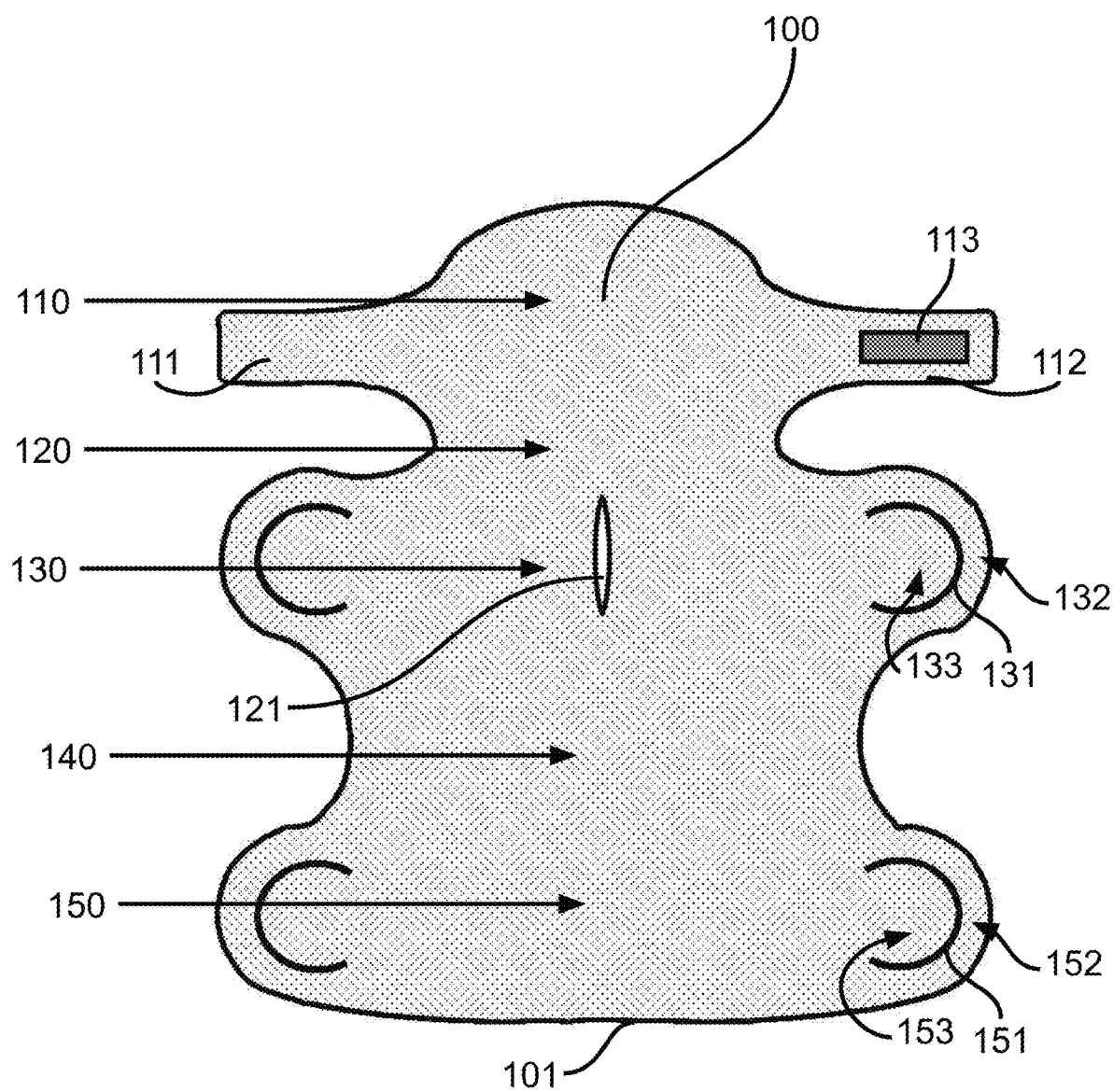
FIG. 1 is a top view of the garment.
Figure 2:
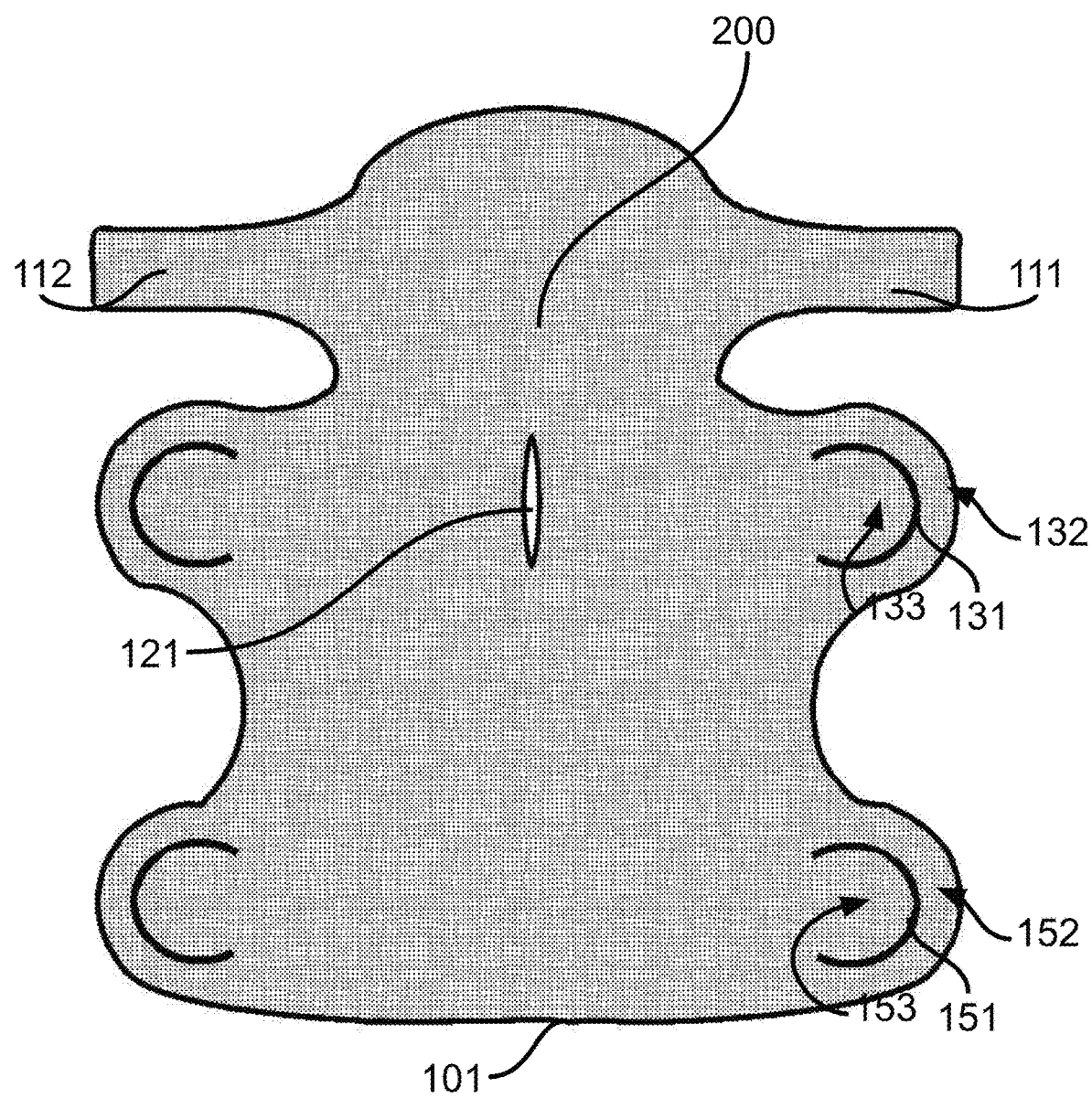
FIG. 2 is a bottom view of the garment.

Among other key features, the garment disclosed herein provides a means for securing the garment to a non-human wearer without inclusion of extrinsic fastening elements such as adhesives, Velcro®-type hook-and-eye fasteners, buttons, laces, or buckles. To this end, as illustrated in FIG. 1, the garment includes one or more leg slits 131, 151. Each slit is configured such that a foot and leg of an animal wearer may pass through it. Each leg slit is disposed within a leg area 132, 152 comprising an inner leg area 133, 153 and outer leg area 134, 154. Each leg slit is separated from the outer edge 101 of the garment by the outer leg area 134, 154, which is configured to pass around the animal's leg 401, at least partially securing the garment to the animal's body, while the inner leg area 133, 153 is configured to fold downward and away from the animal's leg. Preferably, the garment includes a plurality of leg slits. For example, with respect to embodiments configured for quadrupedal animals, the garment may include two front leg slits 131 and two hind leg slits 151.

The garment has a top surface 100 and a bottom surface 200. In various embodiments, securing the garment to the animal wearer involves wrapping the garment around the animal's body such that the bottom surface 200 of the garment's leg area 131, 151 engages with the animal's foot and leg 401. The animal's leg thus passes through the leg slit 131, 151 from the back surface 200, emerging from the front surface 100.

Figure 3:
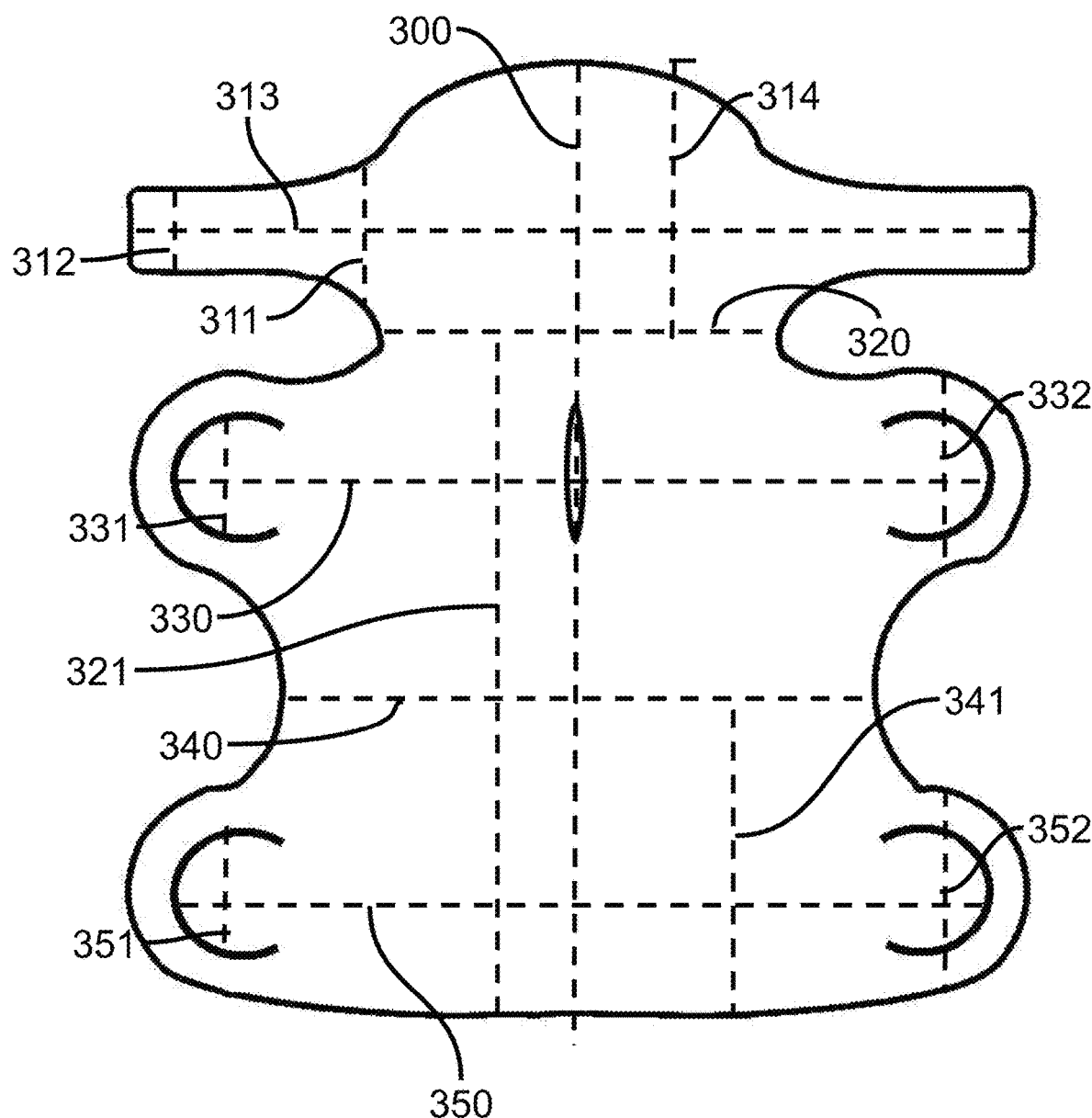
FIG. 3 is a top view of the garment, wherein various dimensions are depicted in dashed lines.
Figure 4:
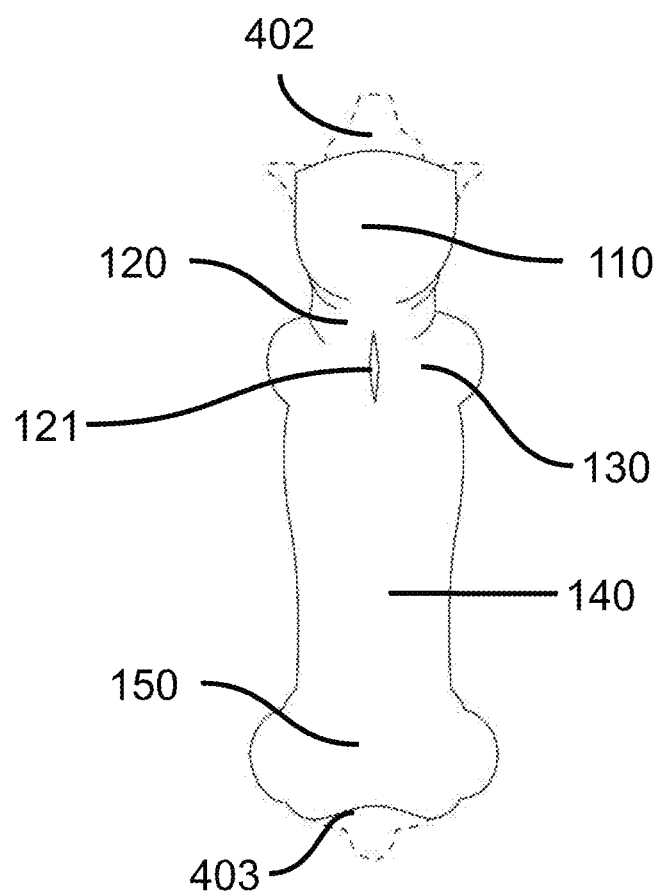
FIG. 4 is a top view of the garment secured to an animal.
Figure 5:
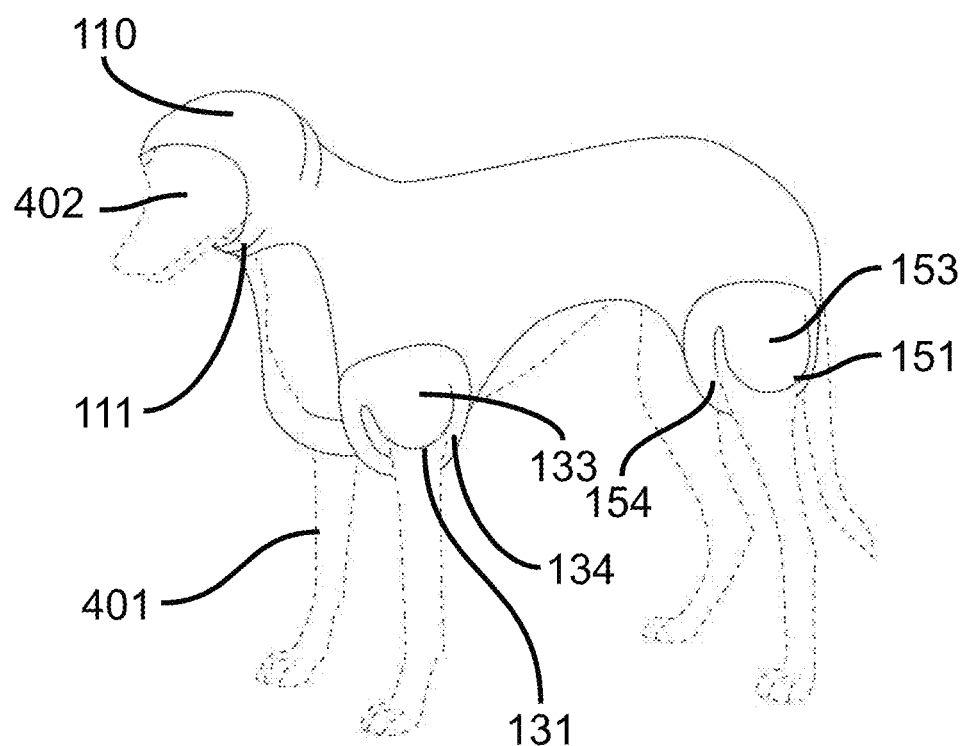
FIG. 5 is a perspective view of the garment secured to an animal.
Figure 6:
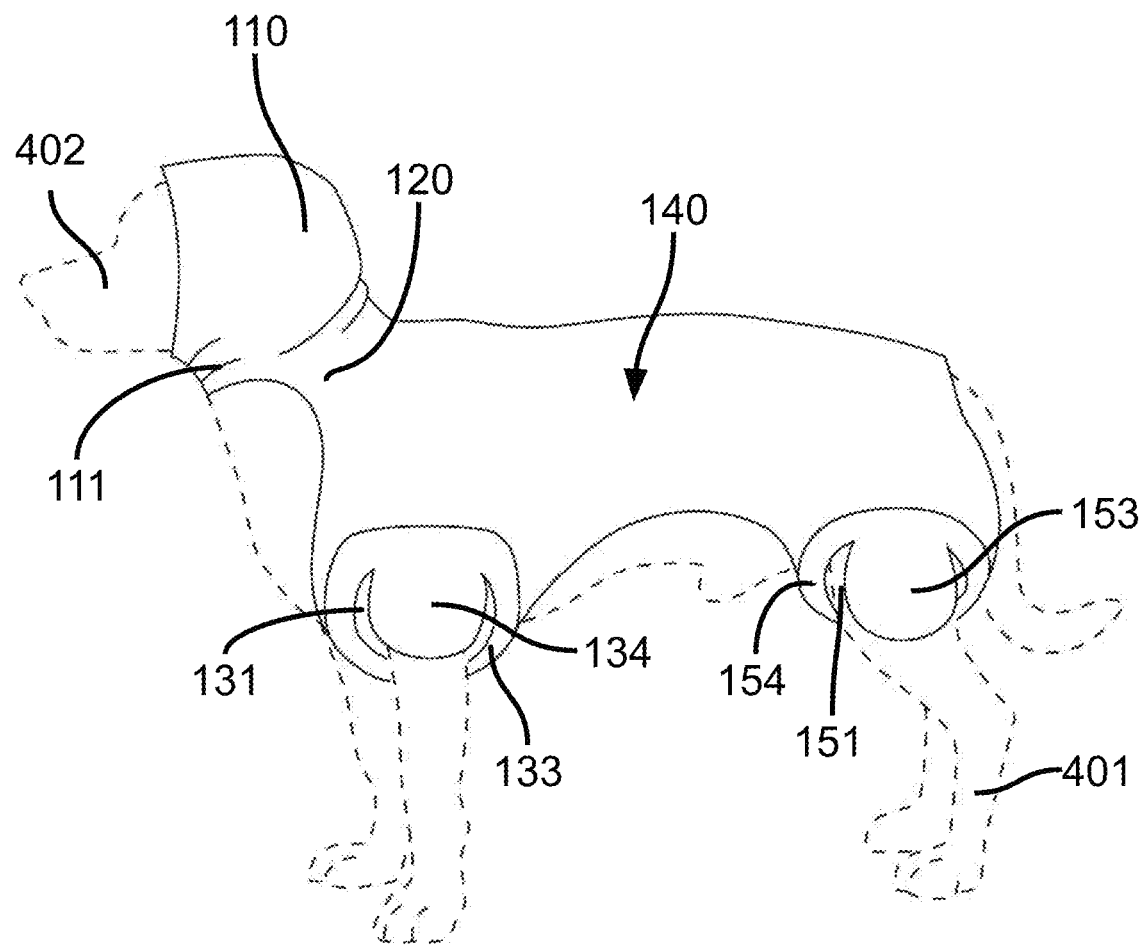
FIG. 6 is a side view of the garment secured to an animal, in which the hood element is engaged.
Figure 7:
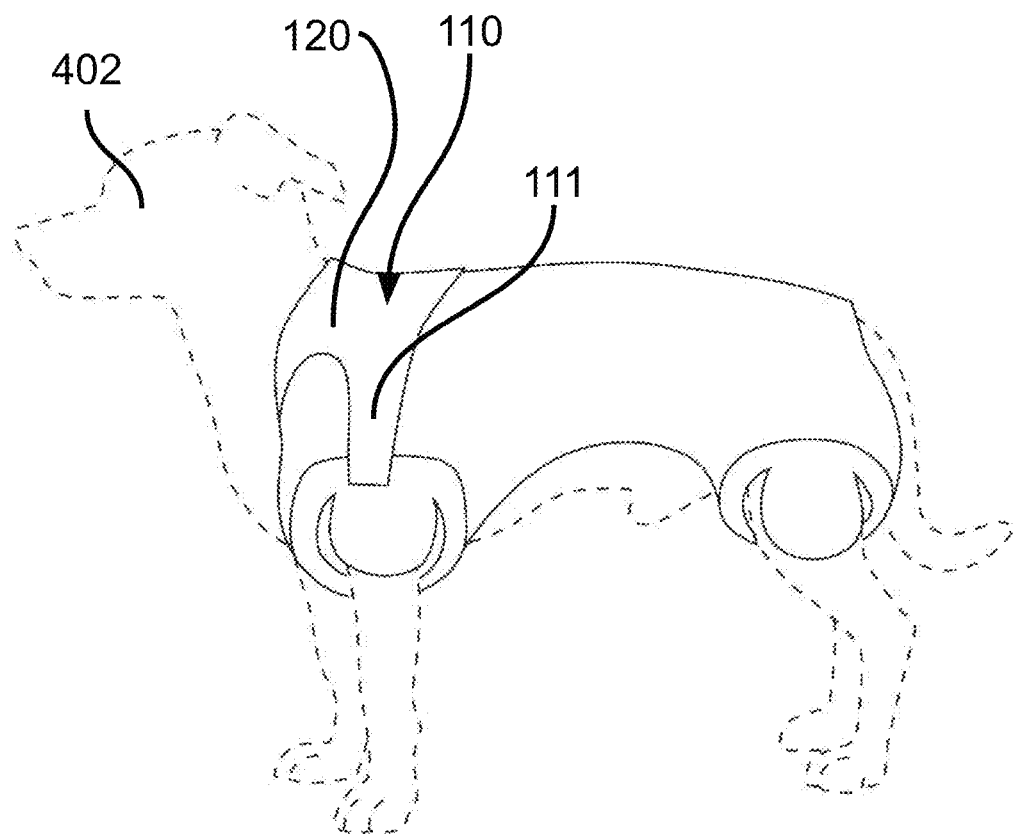
FIG. 7 is a side view of the garment secured to an animal, in which the hood element is not engaged.

In various embodiments, the leg slits are substantially concave. This configuration addresses a problem encountered by pet owners, wherein the wriggling or other movement by an uncooperative animal makes it difficult to maneuver and/or position an animal wearer's leg with precision when attempting to place it through a garment's sleeve or other opening. As a result, the animal's leg may engage with the garment at a sub-optimal location. Furthermore, sudden and/or forcible movements by the animal may cause material wear and stress to the garment. The concave shape of the leg slit allows the slit to readily accommodate the animal's leg while reducing the risk of tearing or warping the garment. As illustrated in FIG. 3, width measurements may be defined for each concave leg slit 131, 151, such as the maximum diameter of the leg slit's curve, while each leg area may have a width measurement defined by the maximum distance between two outer edges of the outer leg area 134, 154. Front and hind leg measurements may vary, such that the garment may have a front leg slit width 331, front leg area width 332, hind leg slit width 351, and hind leg area width 352.

FIG. 3 illustrates various key dimensions of the garment. The garment has a length 300, defined as the distance between the garment's front edge and rear edge along the garment's center line. Preferably, said garment length corresponds to the distance between a point directly above the animal wearer's eyes (or the center of the animal wearer's forehead) and the base of the animal's tail 403. In alternative embodiments, the garment length may correspond to the distance between the base of the animal wearer's neck and the base of the animal's tail.

Along its length 300, the garment may have different sections of varying width. For example, referring to FIG. 1, the garment may have, from front to back, a hood section 110, a neck section 120, a front leg section 130, a midsection 140, and a hind leg section 150. Referring to FIG. 3, a neck girth 320 measurement may be defined by the shortest distance between the left and right edges of the neck section. Likewise, a midsection width 340 measurement may be defined by the shortest distance between the left and right edges of the midsection. Front leg area width 330 and hind leg area width 350 measurements may be defined by the longest distance between the left and right edges of the front leg section 130 and hind leg section 150, respectively.

In various embodiments, the garment includes a hood section 110 associated with the animal wearer's head 402. It is desirable that the hood cover sufficient portion of the animal's head to provide at least partial protection from rain and other weather. Preferably, however, the hood must be fit tightly enough around the animal's head to prevent the hood from covering the animal's eyes or face and to prevent the hood from slipping down the animal's neck when the animal moves. Therefore, another important feature of the garment disclosed herein is a means of adjusting the fit of the garment's hood and securing the hood to the animal's head. To this end, the hood section 110 includes one or more straps 111, 112 configured to pass beneath the chin of the animal wearer. Preferably, at least one strap includes a fixture element 113 sufficient to secure the strap(s) around the animal's chin, which fixture element may also enable the length of the strap(s) to be adjusted.

For example, FIG. 1 shows an embodiment having a left hood strap 111 and right hood strap 112. The right hood strap 112 comprises a sticky adhesive 113 on its top surface 100, which may be covered by a protective element, such as paper, until the hood is ready to be engaged, at which time the protective element may be peeled away. When the straps are wrapped beneath the animal's chin, the adhesive 113 on the right strap's top surface 100 may engage with the bottom surface 200 of the left strap 111 at a plurality of points along the length of the second strap. When so engaged, the two straps are coupled to form a hood strap of fixed length. The hood strap can thereby be fastened tightly around animal necks of varying girths.

Each hood strap 111, 112 has one or more widths 311, 312, as shown in FIG. 3. In order to reduce tearing, it may be preferable that a strap's width be tapered, such that a strap is wider at its base, proximate to the center line 300 of the garment, and narrower at its end, proximate to the edge of the garment. In such embodiments, each hood strap thus has at least one inside width 311 and at least one outside width 312. The hood strap length 313 is defined as the length between the outer edge of the left strap 121 and the outer edge of the right strap 122. The hood length 314 is defined as the length along the center line 300 from the front edge of the hood section 110 to the narrowest area of the neck section 120. Preferably, the hood length 314 corresponds to the length from the animal wearer's forehead to the base of the animal wearer's neck.

In various embodiments, the garment also features an opening 121 configured to accommodate a leash. Said leash opening allows one end of a leash to be inserted through the top surface of the garment in order to engage with a collar or harness beneath. The leash opening may be located on the center line 300 of the garment, midway between the front leg slits 131 and immediately behind the neck area 120. The positioning of the leash opening may correspond to the midpoint between the animal's shoulder blades. Optimally, the leash opening is between two inches and four inches in length, large enough to allow a user to easily couple the leash to the collar or harness but small enough to prevent excessive moisture from penetrating the top surface of the garment.

In order to accommodate different animals of varying body shapes and sizes, it is envisioned that the garment disclosed herein will be manufactured in a plurality of models featuring varying sizes and proportions. In order to facilitate sizing, it is advantageous to define particular dimensions, the measurements of which will vary according to the garment model. For example, such dimensions may include garment length 300, strap length 313, neck girth 320, front leg area width 332, front leg slit width 331, midsection width 340, hind leg area width 352, hind leg slit width 351, slit width 331, 351, length from neck to tail 321 and/or length from midsection to base of tail 341. As illustrated in the accompanying sizing charts, the dimension measurements of different models may be selected in order to correspond to different animal breeds or species.

Another important feature of the invention disclosed herein is to provide an animal garment suitable for disposal after a single use. The garment is thus preferably constructed from compostable or biodegradable plastic sheets. Garments comprising compostable plastic will break down into water, carbon dioxide, and biomass, making their use and disposal environmentally sustainable. Biodegradable plastics may break down into smaller plastics and/or metals but may nevertheless offer improved environmental sustainability relative to traditional plastics, which may remain in landfills for decades without substantial decomposition. In various embodiments, materials satisfying specification standard ASTM D6400 are used. For example, garment materials may comprise compostable biopolymers such as polybutylene adipate terephthalate (PBAT) and/or polylactide (PLA).

At the same time, the garment material must offer adequate protection from rain and other harsh weather and must be strong enough to resist tearing and warping, even when the animal wearer is jumping, playing, running, or engaging in other vigorous movement. For these reasons, water-resistant plastic sheets with a thickness of at least 60 gauge (0.0006 inches) are preferred.

In various embodiments, ornamental designs may be printed on the top surface of the garment. The garment may also be manufactured to order, such that consumers may purchase a unit of garments featuring a custom design. Businesses may also wish to purchase custom garments printed with promotional designs or messaging.

It is envisioned that a plurality of garments will be packaged together and distributed to consumers as a single unit. In various embodiments, said packaging will feature elements configured to dispense one garment at a time.

What is claimed is:

1. An animal garment, comprising:
A top surface;
A bottom surface, wherein the top surface and the bottom surface are separated by a substantially continuous sheet of material of substantially uniform thickness;
A length; An outer edge;
A first leg section having a first leg section width on an axis perpendicular to the garment length;
A midsection arranged adjacent to the first leg section and having a midsection width on an axis perpendicular to the garment length, wherein the midsection width is less than the first leg section width; and
A plurality of leg slits allowing an animal's leg to pass through the top surface and bottom surface of the garment, wherein at least two leg slits are disposed within the first leg section area and each leg slit is separated from the outer edge by an outer leg area integral to the continuous sheet of material and wrapping around a corresponding leg of the animal and thereby secure the garment to the animal's body without use of extrinsic fasteners; and wherein said each leg slit is in the same plane as said each outer leg area.

2. The garment of claim 1, further comprising:
A second leg section having a second leg section width on an axis perpendicular to the garment length, wherein the midsection is arranged between the first leg section and the second leg section and the midsection width is less than the second leg section width; and
A plurality of leg slits configured to allow an animal's leg to pass through the top surface and bottom surface of the garment, wherein at least two leg slits are disposed within the second leg section area.

3. The garment of claim 1, wherein the leg slits are substantially concave and configured to facilitate insertion of a leg at varied angles.

4. The garment of claim 1, further comprising:
A hood section comprising a strap and an adhesive element; and
A neck section having a neck section width, wherein the neck section is arranged between the hood section and the first leg section and the neck width is less than the first leg section width.

5. The garment of claim 4, wherein the hood section comprises a first strap and a second strap and wherein the adhesive element is disposed on the top surface at the first strap and configured to adhere to the bottom surface at the second strap.

6. The garment of claim 1, further comprising an opening disposed at least partially within the first leg area, wherein the opening is configured to allow a leash to pass through the top surface and bottom surface of the garment.

7. The garment of claim 1, wherein the length is between 7 and 34 inches and the first leg section width is between 9 and 43 inches.

8. The garment of claim 1, wherein the thickness of the material separating the top surface and the bottom surface is at least 60 gauge.

9. The garment of claim 1, wherein the garment is a disposable sheet composed of substantially biodegradable materials and configured for single use.

10. The garment of claim 9, wherein the garment is substantially composed of compostable biopolymers.

* * * * *